United States Patent
Helfinstine et al.

(10) Patent No.: US 12,200,136 B2
(45) Date of Patent: Jan. 14, 2025

(54) SYSTEMS AND METHODS FOR SECURE COMMUNICATION

(71) Applicant: Comcast Cable Communications, LLC, Philadelphia, PA (US)

(72) Inventors: Charles A. Helfinstine, Wynnewood, PA (US); Yiu Leung Lee, Philadelphia, PA (US); Joseph Crowe, Philadelphia, PA (US); Thomas Modayil Jacob, Wayne, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 221 days.

(21) Appl. No.: 17/303,455

(22) Filed: May 28, 2021

(65) Prior Publication Data
US 2022/0385474 A1 Dec. 1, 2022

(51) Int. Cl.
*H04L 9/32* (2006.01)
*H04L 9/40* (2022.01)

(52) U.S. Cl.
CPC ........ *H04L 9/3236* (2013.01); *H04L 63/0254* (2013.01); *H04L 63/166* (2013.01)

(58) Field of Classification Search
CPC . H04L 9/3236; H04L 63/0254; H04L 63/166; H04L 63/0428
See application file for complete search history.

(56) References Cited

U.S. PATENT DOCUMENTS

| | | | |
|---|---|---|---|
| 8,266,672 B2* | 9/2012 | Moore | H04L 61/4511 726/1 |
| 10,447,710 B1* | 10/2019 | Li | H04L 63/0209 |
| 10,924,456 B1* | 2/2021 | Moore | H04L 63/0281 |
| 11,019,022 B1* | 5/2021 | Thornewell | H04L 67/564 |
| 2017/0093802 A1* | 3/2017 | Norum | H04L 63/0428 |
| 2017/0195429 A1* | 7/2017 | Bokare | H04L 63/00 |
| 2018/0205742 A1* | 7/2018 | Vinukonda | H04L 63/107 |
| 2020/0007585 A1* | 1/2020 | Williams | H04W 12/37 |
| 2021/0067455 A1* | 3/2021 | Lahtiranta | H04L 47/2483 |
| 2021/0092595 A1* | 3/2021 | Ramachandran | H04B 7/18593 |
| 2021/0135854 A1* | 5/2021 | Karame | G06Q 20/3678 |
| 2021/0243170 A1* | 8/2021 | Puente Pestaña | H04W 8/18 |
| 2022/0006797 A1* | 1/2022 | Lehtikuja | H04L 63/045 |
| 2022/0103370 A1* | 3/2022 | Alwen | H04L 9/30 |
| 2022/0103525 A1* | 3/2022 | Shribman | G06F 16/955 |
| 2022/0239696 A1* | 7/2022 | Konda | H04L 61/4511 |
| 2022/0269638 A1* | 8/2022 | Dastidar | H04L 69/12 |
| 2022/0353197 A1* | 11/2022 | Singh | H04L 47/625 |

FOREIGN PATENT DOCUMENTS

CN 112667309 A * 4/2021

* cited by examiner

Primary Examiner — David J Pearson
(74) Attorney, Agent, or Firm — BakerHostetler

(57) ABSTRACT

An encrypted message comprising a DNS request may be received from a client device. The DNS request may be decrypted to determine an IP address and a port associated with the client device. A security token may be determined based on the IP address and the port. A message comprising an indication of the DNS request and the security token may be sent to a DNS server. A reply comprising a payload and the security token may be received from the DNS server. Based on the security token, an indication of the payload of the reply may be sent to the client device.

17 Claims, 9 Drawing Sheets

SYSTEMS AND METHODS FOR SECURE COMMUNICATION

BACKGROUND

A Domain Name System (DNS) server may map internet protocol (IP) addresses to domain names. The DNS server may allow a user to access a website at a particular IP address based on the user submitting a domain name associated with the website, such as by entering the domain name in a browser. Messages to and from the DNS server may be in a format such as cleartext, which may leave the messages vulnerable to malicious actions, such as by an interceptor. Encrypting the messages to address these concerns using existing encryption methods may cause a significant reduction in performance as a result of the computational load associated with encryption. As such better techniques are needed to protect DNS communications.

SUMMARY

A client device may send an encrypted DNS request to an encryption module such as a DNS encryption module associated with a website and/or a DNS server. The DNS request may indicate the DNS server with which the client device wants to communicate. The encryption module may decrypt the DNS request to determine an IP address and/or a port indicated by the DNS request and associated with the DNS client. The encryption module may determine a security token, such as a cookie, using the IP address and/or port associated with the DNS client, such as by applying a hash function to the IP address and/or port.

The encryption module may send a message comprising the security token and an indication of the DNS request to the DNS server. The encryption module may receive a reply comprising a payload and the security token from the DNS server. Based on the security token, the encryption module may determine that the reply is intended for the client device. The encryption module may send an indication of the payload to the client device, such as through a secure communication session.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

The following drawings show generally, by way of example, but not by way of limitation, various examples discussed in the present disclosure. In the drawings.

DETAILED DESCRIPTION

Figure 1:
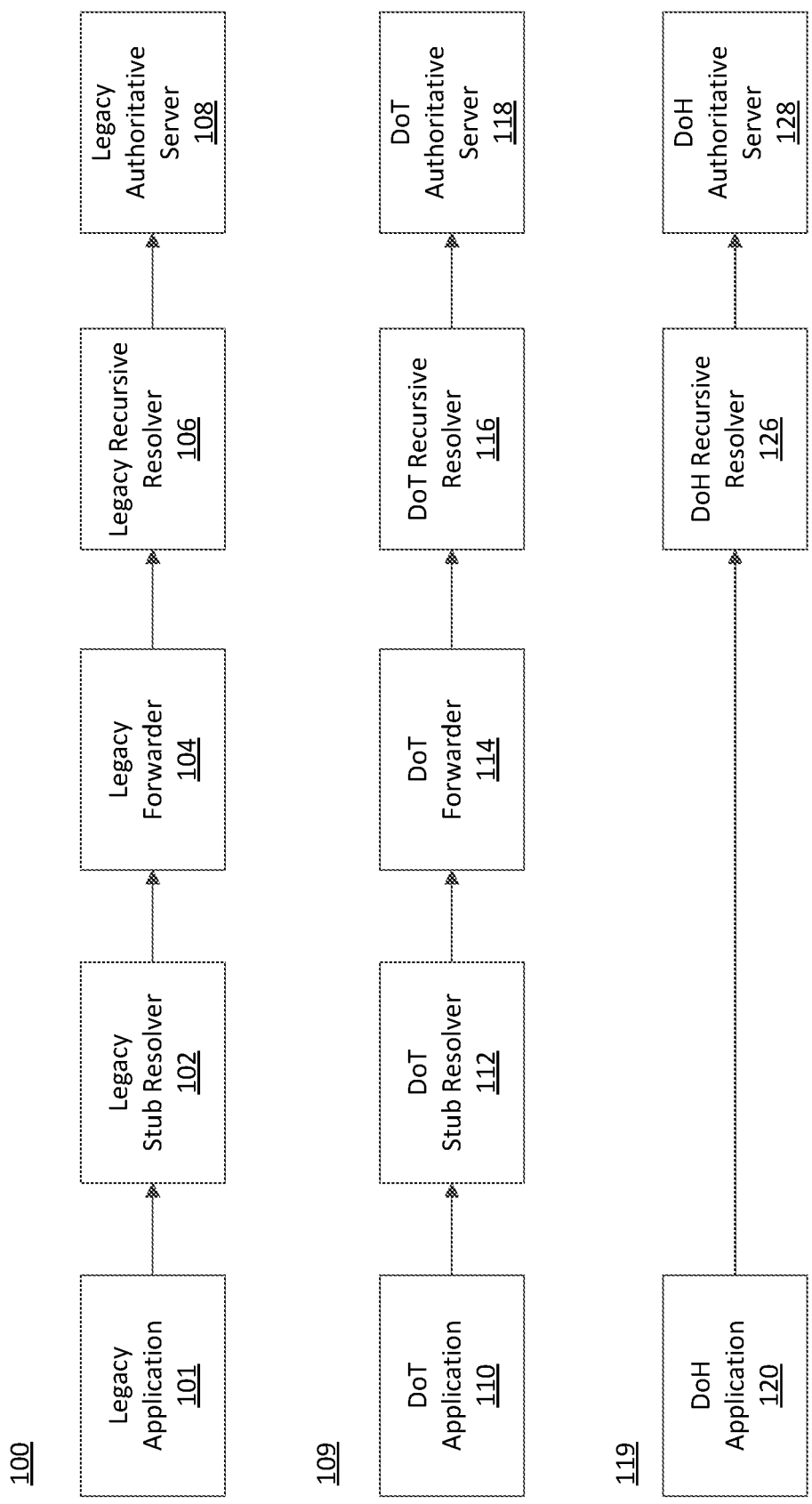
FIG. 1 shows an example method.

FIG. 1 shows example domain name system (DNS) query methods 100, 109, 119. The method 100 may comprise a DNS query method. The method 100 may comprise a method of sending DNS queries via cleartext. The method 100 may comprise a method of sending DNS queries without one or more layers of encryption, such as DNS-over-TLS (DoT) and/or DNS-over-HTTPS (DoH).

The method 100 may be performed by a system and/or computing device comprising an application 101. The application 101 may be configured to run on a client device, such as a user device, a set-top box, cable modem, gateway, smart television, smart phone, laptop, desktop, tablet, wearable device, and/or other computing device. The application 101 may comprise a browser. The application 101 may be configured to generate a DNS query. The DNS query may comprise an indication of a domain name, such as a domain name associated with a website. The application 101 may be configured to send the DNS query. The application 101 may be configured to send the DNS query via cleartext.

The DNS query from the application 101 may be received by a stub resolver 102. The stub resolver 102 may comprise an operating system of the client device. The stub resolver 102 may determine whether a result of the DNS query was returned previously and is stored in a local cache on the client device. If the result is already present in the cache, then the stub resolver 102 may return the result to the client device from the cache and does not need to send the DNS query to a DNS server. If the DNS information is not in the cache, then the stub resolver may send the DNS query on to a forwarder 104. The stub resolver 102 may be configured to send the DNS query via cleartext.

The DNS query from the stub resolver may be received by a forwarder 104. The forwarder 104 may comprise a premises firewall, such as a home firewall or an enterprise firewall. The forwarder 104 may comprise a router, such as at the premises.

The forwarder 104 may be configured to determine whether the requested domain name is appropriate for settings associated with the application 101. Based on the forwarder 104 determining that the requested domain name is inappropriate, the forwarder 104 may be configured to not send the DNS request. Based on the forwarder 104 determining that the requested domain name is appropriate, the forwarder 104 may be configured to send the DNS request. The forwarder 104 may be configured to send the DNS request via cleartext.

The DNS request from the forwarder 104 may be received by a recursive resolver 106. The recursive resolver 106 may comprise a DNS recursor associated with an Internet service provider (ISP) or cloud-computing environment. The recursive resolver 106 may comprise a DNS server.

The recursive resolver 106 may be configured to determine DNS information. For example, the recursive resolver 106 may be configured to determine an internet protocol (IP) address associated with a requested domain. The recursive resolver 106 may be configured to send the DNS query to the IP address associated with the requested domain. The recursive resolver 106 may be configured to send the DNS query to the determined IP address via cleartext.

The IP address may be associated with an authoritative server 108. The authoritative server 108 may receive the DNS query from the recursive resolver 106. The authoritative server 108 may be configured to determine a reply to the DNS query. The authoritative server 108 may be configured to send the reply to the recursive resolver 106.

The recursive resolver 106 may be configured to send the reply from the authoritative server 108 to the forwarder 104, the stub resolver 102, and/or the application 101. The forwarder 104 may be configured to send the reply to the stub resolver 102 and/or the application 101. The stub resolver 102 may be configured to send the reply to the application 101. The application 101 may be configured to output an indication of the reply, such as to a user via a display of the client device.

A drawback of the DNS query method 100 is that the sending of the DNS query in cleartext may make the DNS query vulnerable such as to interceptors. Sending the DNS query in cleartext also exposes data associated with the client device in the DNS query to the authoritative server 108. The authoritative server 108 may be associated with a third-party, such as a party that is not the user, the ISP, and/or the cloud computing environment. The third-party may exploit the data, such as by selling the data, saving the data to learn more about the user, and/or by targeting the user with advertisements.

The method 109 may comprise a method of sending DNS queries with one more layers of encryption, such as DoT. The method 109 may be performed by a system and/or computing device comprising a DoT application 110. The DoT application 110 may be configured to run on a client device, such as a set-top box, cable modem, gateway, smart television, smart phone, laptop, desktop, tablet, wearable device, and/or other computing device. The DoT application 110 may comprise a browser. The DoT application 110 may be configured to generate a DNS query. The DNS query may comprise an indication of a domain name, such as a domain name associated with a website. The DoT application 110 may be configured to send the DNS query. The DoT application 110 may be configured to send the DNS query via cleartext.

The DNS query from the DoT application 110 may be received by a DoT stub resolver 112. The DoT stub resolver 112 may comprise a part of? an operating system of the client device. The DoT stub resolver 112 may determine whether a result of the DNS query was returned previously and is stored in a local cache on the client device. If the result is already present in the cache, then the DoT stub resolver 112 simply returns the result to the client device from the cache and does not need to send the DNS query to a DNS server. If the DNS information is not in the cache, then the DoT stub resolver may send the DNS query. The DoT stub resolver 112 may be configured to send the DNS query via TLS.

The DNS query from the DoT stub resolver may be received by a DoT forwarder 114. The DoT forwarder 114 may comprise a premises firewall, such as a home firewall or an enterprise firewall. The DoT forwarder 114 may comprise a router, such as at the premises.

The DoT forwarder 114 may be configured to determine whether the requested domain name is appropriate for settings associated with the DoT application 110. Based on the DoT forwarder 114 determining that the requested domain name is inappropriate, the DoT forwarder 114 may be configured to not send the DNS request. Based on the DoT forwarder 114 determining that the requested domain name is appropriate, the DoT forwarder 114 may be configured to send the DNS request. The DoT forwarder 114 may be configured to send the DNS request via TLS.

The DNS request from the DoT forwarder 114 may be received by a DoT recursive resolver 116. The DoT recursive resolver 116 may comprise a DNS recursor associated with an Internet service provider (ISP) or cloud-computing environment. The DoT recursive resolver 116 may comprise a DNS server.

The DoT recursive resolver 116 may be configured to determine DNS information. For example, the DoT recursive resolver 116 may be configured to determine an IP address associated with a requested domain. The DoT recursive resolver 106 may be configured to send the DNS query to the IP address associated with the requested domain. The DoT recursive resolver 116 may be configured to send the DNS query to the determined IP address via cleartext.

The IP address may be associated with a DoT authoritative server 118. The DoT authoritative may be associated with a website. The DoT authoritative server 118 may receive the DNS query from the DoT recursive resolver 116. The DoT authoritative server 118 may be configured to determine a reply to the DNS query. The DoT authoritative server 118 may be configured to send the reply to the DoT recursive resolver 116.

The DoT recursive resolver 116 may be configured to send the reply from the DoT authoritative server 118 to the DoT forwarder 114, the DoT stub resolver 112, and/or the DoT application 110. The DoT forwarder 114 may be configured to send the reply to the DoT stub resolver 112 and/or the DoT application 110. The DoT stub resolver 112 may be configured to send the reply to the DoT application 110. The DoT application 110 may be configured to output an indication of the reply, such as to a user via a display of the client device.

A drawback of the DoT DNS query method 109 is that the sending of the DNS query between one or more of the DoT stub resolver 102, the DoT forwarder, and/or the DOT recursive resolver server may incur a computational load. The computational load may cause latency in the process of sending the DNS query and receiving a reply to the DNS query.

The DoH method of DNS query processing is shown at 119. The method 119 may comprise a method of sending DNS queries with one more layers of encryption, such as DoH. The method 119 may be performed by a system and/or computing device comprising a DoH application 120. The DoH application 120 may be configured to run on a client device, such as a set-top box, cable modem, gateway, smart television, smart phone, laptop, desktop, tablet, wearable device, and/or other computing device. The DoH application 120 may comprise a browser. The DoH application 120 may be configured to generate a DNS query. The DNS query may comprise an indication of a domain name, such as a domain name associated with a website. The DoH application 120 may be configured to send the DNS query. The DoH application 120 may be configured to send the DNS query using HTTPS.

The DNS query from the DoH application 120 may be sent to a DoH recursive resolver. The DNS query may not be sent to a DoH stub resolver and/or a DoH forwarder. Instead, the DNS query may be sent directly to the DoH recursive resolver. This may be the result of the DoH application being configured to send DNS queries directly to the DoH recursive resolver associated with the DoH application or a company associated with the DoH application, such as a browser host, like Google or Firefox.

Recently, web browsers such as Chrome and Firefox have pursued an implementation of DoH that sends all DNS queries to a central platform, bypassing an ISP's DNS. According to such an implementation, the DoH recursive resolver 126 may comprise a DNS recursor associated with an Internet service provider (ISP) or cloud-computing environment. The DoH recursive resolver 126 may comprise a DNS server. The DoH recursive resolver 126 may be configured to determine DNS information. For example, the DoH recursive resolver 126 may be configured to determine an IP address associated with a requested domain. The DoH recursive resolver 126 may be configured to send the DNS query to the IP address associated with the requested domain. The DoH recursive resolver 126 may be configured to send the DNS query to the determined IP address via cleartext.

The IP address may be associated with a DoH authoritative server 128. The DoH authoritative may be associated with a website. The DoH authoritative server 128 may receive the DNS query from the DoH recursive resolver 126. The DoH authoritative server 128 may be configured to determine a reply to the DNS query. The DoH authoritative server 128 may be configured to send the reply to the DoH recursive resolver 126.

The DoH recursive resolver 126 may be configured to send the reply from the DoH authoritative server 128 to the DoH forwarder, the DoH stub resolver, and/or the DoH application 120. The DoH recursive resolver 126 may be configured to send the reply using HTTPS.

A drawback of the DoH DNS query method 119 is that the sending of the DNS query from the DoH application 120 directly to the DoH recursive resolver 126 may prevent, impair, or impose costs on ISP's and/or service providers from providing customer features and/or business functions that depend on ISP DNS. For example, the DoH DNS query method 119 may not allow ISP's to provide breakage or impairment of provisioning walled garden, CDN localization, parental controls, malware detection and/or prevent, and troubleshooting, as examples.

Figure 2:
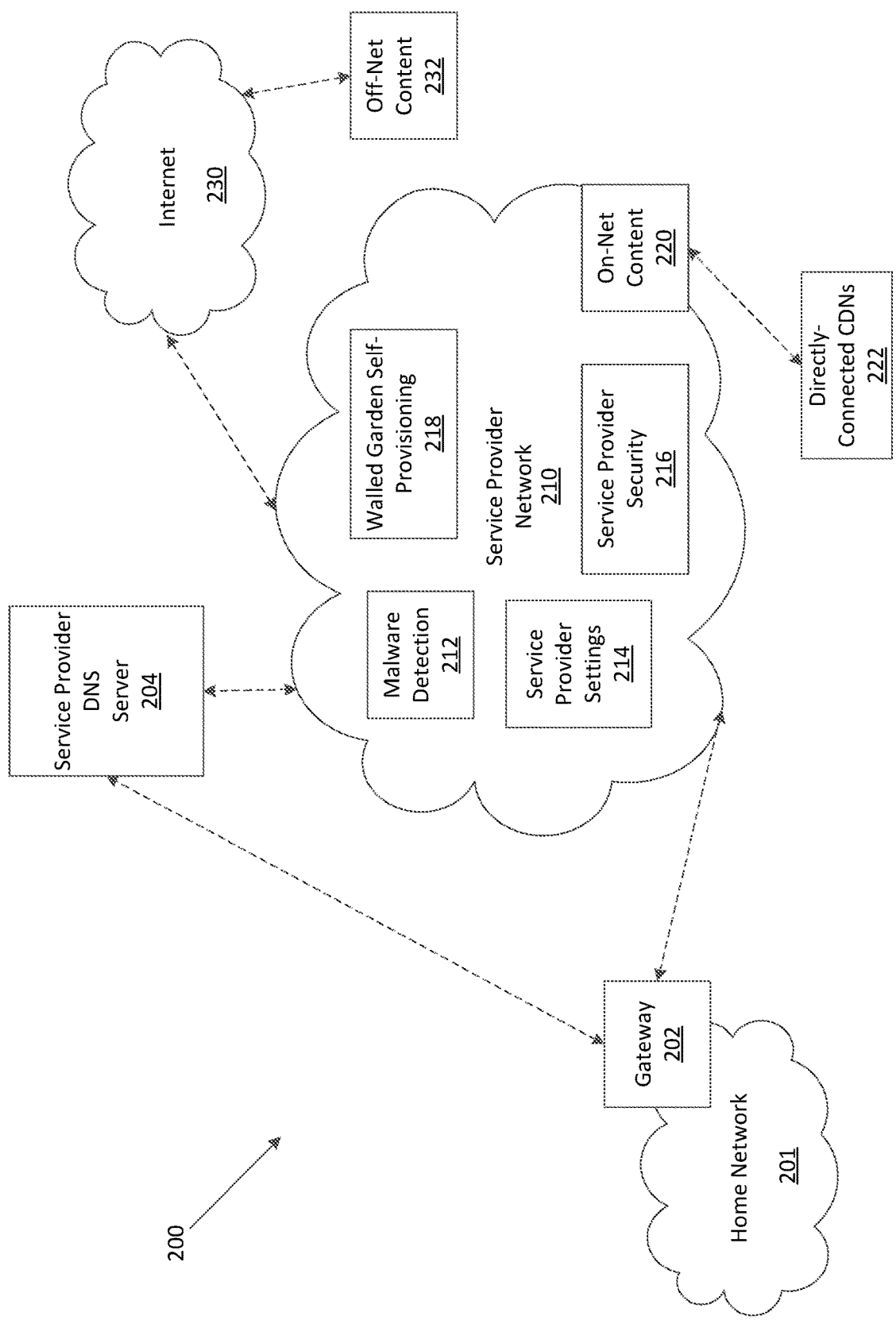
FIG. 2 shows an example system.

FIG. 2 shows an example networking environment 200. The networking environment 200 may be associated with a service provider. The networking environment 200 may comprise a service provider DNS server 204. The DNS server 204 may comprise one or more of the recursive resolver servers 106, 116, 126 in FIG. 1. The DNS server 204 may be configured to receive DNS queries, such as from one or more client devices. The DNS server 204 may be configured to initiate a secure communication session with the client devices, such as a communication session via TLS and/or HTTPs.

The networking environment 200 may comprise a home network 201. The home network 201 may be associated with a premises. For example, the home network 201 may comprise a local area network at a house or a business. The home network 201 may comprise one or more client devices. The home network 201 may comprise a gateway 202. The gateway 202 may be configured to communicate with other devices in the home network 201 and/or located at the premises, such as the client devices. The gateway 202 and/or the client devices may be configured to communicate with the DNS server 204. The gateway 202 and/or the client devices may comprise, host, or otherwise implement the applications 101, 110, 120 and/or the stub resolvers 102, 112 in FIG. 1. The gateway 202 may be configured to send and/or receive messages. The gateway 202 may be configured to send and/or receive unencrypted messages, such as messages in cleartext. The gateway 202 may be configured to send and/or receive encrypted messages, such as messages sent via TLS and/or HTTPS. The messages may comprise query requests and/or replies to query requests.

The networking environment 200 may comprise a service provider network 210. The service provider network 210 may comprise one or more computing devices associated with and/or controlled by the service provider. The service provider network 210 may comprise an ISP network and/or a cloud computing network. The service provider network 210 may be configured to communicate with the home network 201. The service provider network 210 may be configured to communicate with the DNS server 204. The service provider network 210 may comprise one or more of the forwarders 104, 114 in FIG. 1. The service provider network 210 may comprise features for users, such as malware detection 212, service provider settings 214 (such as parental controls, etc.), service provider security 216, walled garden self-provisioning 218, and/or on-net content 220. One or more devices of the service provider network 210 gateway 202 may be configured to send and/or receive messages from the gateway device 202. One or more devices of the service provider network 210 gateway 202 may be configured to send and/or receive messages from the service provider network 210. The messages may be unencrypted, such as cleartext. Unencrypted messages sent and/or received from the service provider network 210 may be vulnerable to interception, such as by a third party.

The networking environment 200 may comprise one or more directly-connected content delivery networks (CDNs) 222. The directly-connected CDNs 222 may comprise one or more servers, such as web servers and/or servers configured to provide content. The directly-connected CDNs 222 may comprise one or more of the authoritative servers 108, 118, 128 in FIG. 1. The directly-connected CDNs 222 may be configured to access Internet 230.

The networking environment 200 may comprise an off-net content source 232. The directly-connected CDNs 222 may be configured to communicate with the off-net content source 232, such as via the Internet 230. The off-net content source 232 may comprise a content provider. The off-net content source 232 may comprise a content provider other than an internet service provider. The off-net content source 232 may provide content created and/or aggregated by the off-net content source 232, such as movies, TV shows, music, image, and more.

The networking environment 200 may comprise a service provider DNS server 204. The service provider DNS server 204 may be located external to the premises associated with the home network 201. The service provider DNS server 204 may comprise, for example, one or more of the recursive resolvers 106, 116, 126 in FIG. 1. The DNS server 204 may be configured to send and/or receive encrypted messages from a device of the home network 201, such as the gateway device 202. Unencrypted messages sent via the networking environment 300 may be vulnerable, such as to third-party interceptors. Yet, message encryption and/or decryption in the networking environment may cause performance to suffer, such as by causing latency.

Figure 3:
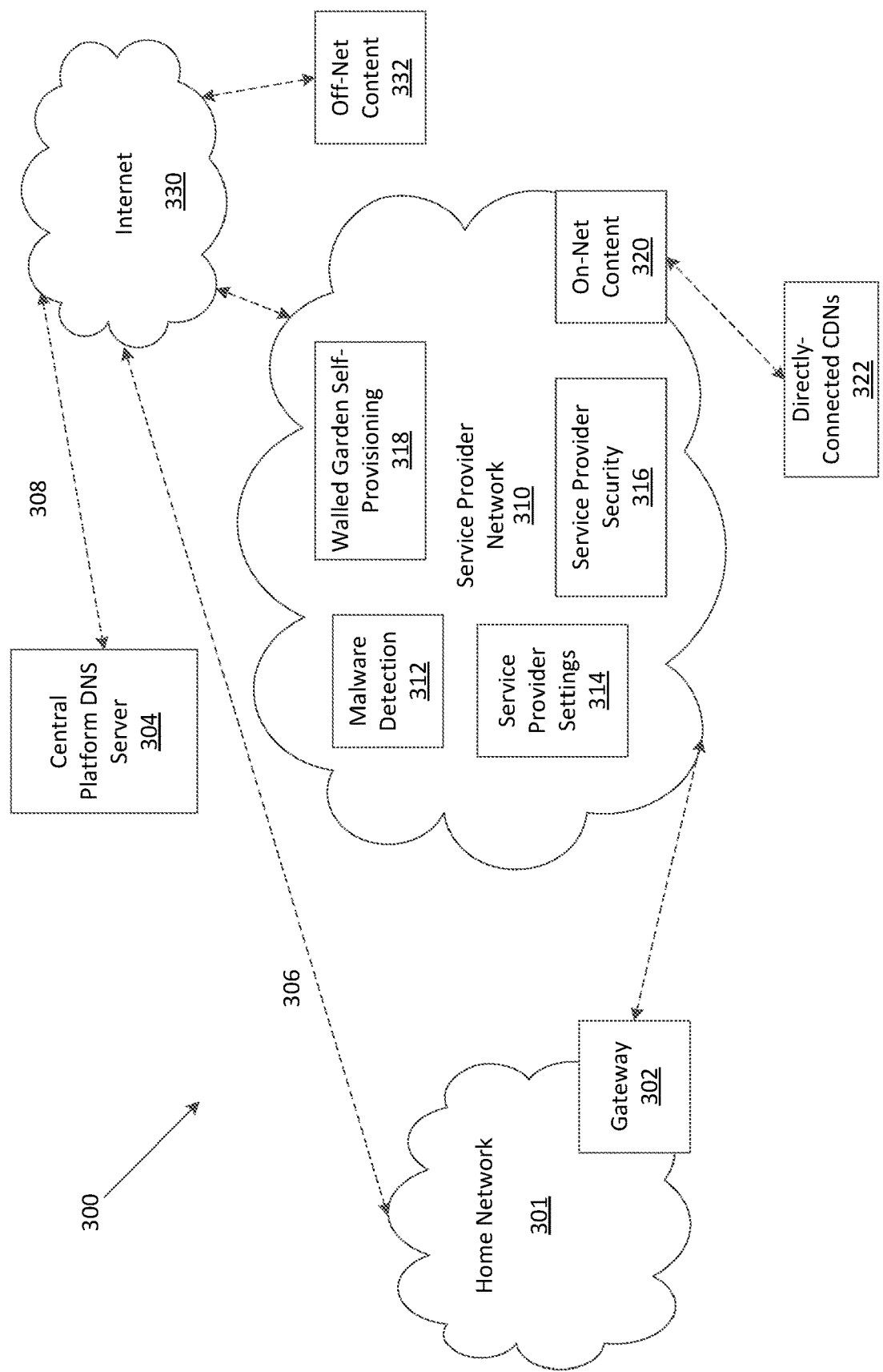
FIG. 3 shows an example system.

FIG. 3 shows an example networking environment 300. The networking environment 300 may comprise the networking environment shown in FIG. 2. The networking environment 300 may be associated with a service provider.

The networking environment 300 may comprise a central platform DNS server 304. The central platform server 304 may comprise one or more of the recursive resolver servers 106, 116, 126 in FIG. 1. The central platform DNS server 304 may be configured to receive DNS queries, such as from one or more client devices. The central platform DNS server 304 may be configured to initiate a secure communication session with the client devices, such as a communication session via TLS and/or HTTPs.

The networking environment 300 may comprise a home network 301. The home network 301 may be associated with a premises. For example, the home network 201 may comprise a local area network at a house or a business. The home network 301 may comprise one or more client devices.

The home network 201 may comprise a gateway 302. The gateway 302 may be configured to communicate with other devices in the home network 201 and/or located at the premises. The gateway 302 and/or the client devices may be configured to communicate with the DNS server 304. The gateway 302 and/or the client devices may comprise the applications 101, 110, 120 and/or the stub resolvers 102, 112 in FIG. 1.

The networking environment 300 may comprise a service provider network 310. The service provider network 310 may comprise one or more computing devices associated with and/or controlled by the service provider. The service provider network 310 may comprise an ISP network and/or a cloud computing network. The service provider network 310 may be configured to communicate with the home network 301. The service provider network 310 may be configured to communicate with the DNS server 304. The service provider network 310 may comprise one or more of the forwarders 104, 114 in FIG. 1. The service provider network 310 may comprise features for users such as malware detection 212, service provider settings 314 (such as parental controls, etc.), service provider security 316, walled garden self-provisioning 318, and/or on-net content 320. One or more devices of the service provider network 310 may be configured to send and/or receive messages from the gateway device 302. One or more devices of the service provider network 310 may be configured to send and/or receive messages from the gateway device 302. The messages may be unencrypted, such as cleartext. The messages may be encrypted, such as via TLS and/or HTTPS.

The gateway 302 may be configured to send and/or receive messages. The message may comprise query requests. The messages may comprise replies to query requests. The messages may be encrypted or unencrypted. The gateway device 302 may be configured to send and/or receive messages via the Internet 330. The gateway device 302 may be configured to receive messages, such as encrypted messages, from the central platform DNS server 304 via the Internet 330. The gateway device 302 may be configured to receive messages from the central platform DNS server 304 instead of from the service provider network 310, as in FIG. 2. Receiving the messages from the central platform DNS server 304 instead of to the service provider network 310 may bypass features of the service provider network 310. Bypassing of the features may compromise user protection.

Figure 4:
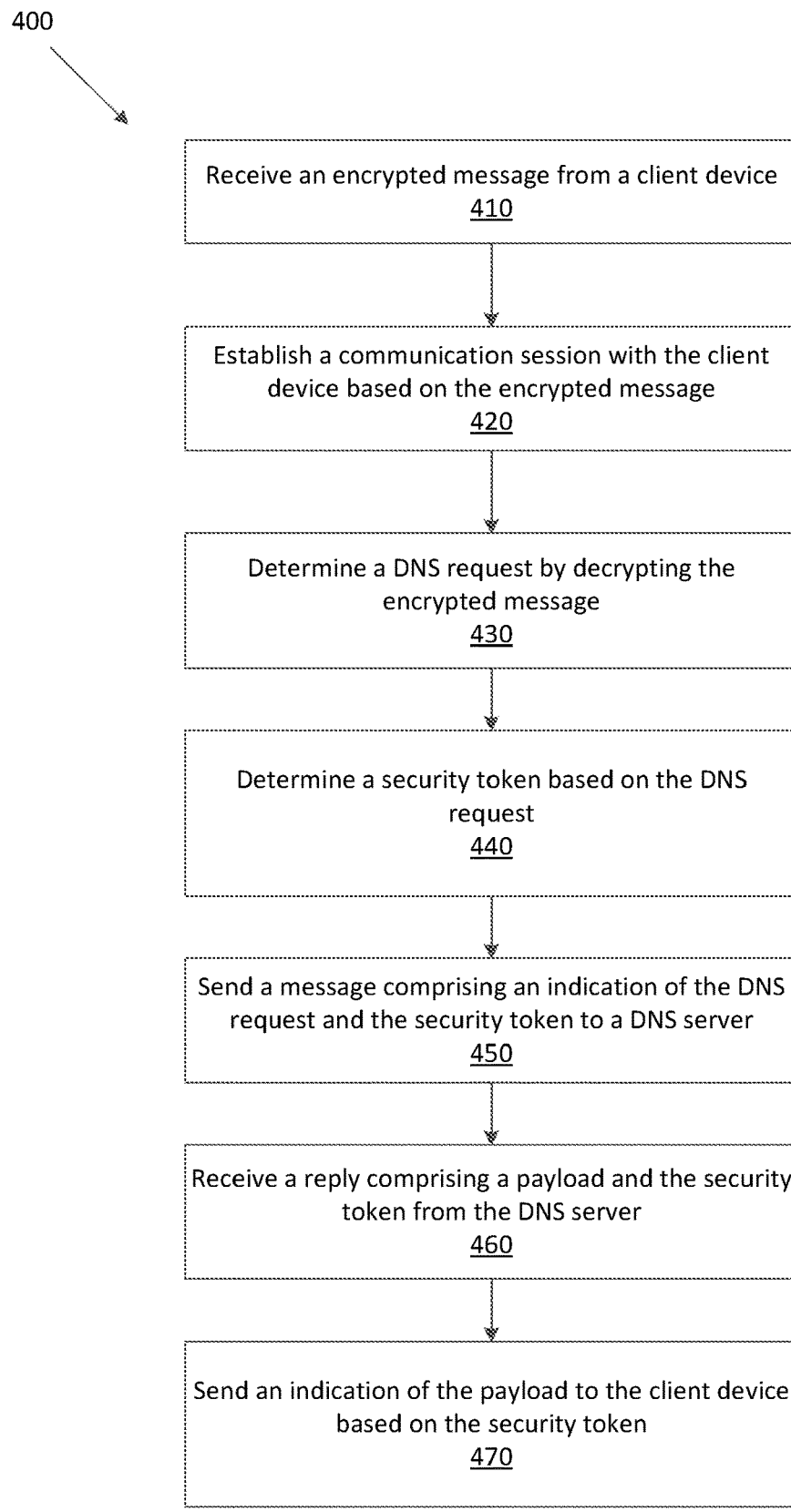
FIG. 4 shows an example method.

FIG. 4 shows an example method 400. The method 400 may be performed by a computing device, such as a computing device associated with a service provider network, such as the service provider networks 210, 310 shown in FIGS. 2 and 3. The method 400 may be performed by one or more of the DoT Recursive Resolver 116 or the DoH Recursive Resolver 126 in FIG. 1. The method 400 may be performed by an encryption module of a device associated with a service provider network. At least a portion of the method 400 may be performed by an encryption module of a DNS server, such as a DNS server (e.g., DNS server host 800 in FIG. 8). The method 400 may be performed by an encryption module comprising a smart network interface card (SmartNIC) (e.g., SmartNIC 512 in FIG. 5). The SmartNIC and the service provider DNS server may be integrated. The service provider DNS server may comprise the SmartNIC. The SmartNIC and the service provider DNS server may be independent components, such as components connected via a communication bus.

At step 410, an encrypted message may be received. The encrypted message may be received from a client device. The encrypted message may comprise a DNS request. The DNS request may comprise a domain name, such as a fully-qualified domain name. The DNS request may comprise at least one of a DoH or a DoT request.

At step 420, a communication session may be established with the client device. The communication session may be established based on receiving the encrypted message in step 410. The communication session may comprise a secure communication session, such as a Transport Layer Secure (TLS) session and/or a Hypertext Transfer Protocol Secure (HTTPS) session. The session may comprise a TLS session or an HTTP session based on whether the request comprises a DoT request or a DoH request.

At step 430, the DNS request may be analyzed, processed or otherwise determined. The DNS request may be determined by decrypting the encrypted message and retrieving the DNS payload. The DNS request may be determined using a key, such as a private key associated with the device that received the DNS request. The DNS request may identify an IP address associated with the client device. The DNS request may identify a port associated with the client device. The port may comprise a series of numbers and/or integer. The port may comprise an unsigned series of numbers and/or integer. The port may be associated with a communication protocol, such as TLS and/or HTTPS. The port may be associated with the communication protocol associated with the secure communication session.

At step 440, a security token, such as a cookie, may be determined. The security token may be determined, for example, by applying a hash function to the IP address and/or the port associated with the client device. The hash function may comprise a one-way hash function.

At step 450, a message may be sent to a DNS server. The DNS server may comprise or function similarly to one or more of the recursive resolvers 106, 116, 126 in FIG. 1, the service provider DNS server 204 in FIG. 2, and/or the central platform DNS server 304 in FIG. 3. The message may comprise an indication of the DNS request. The indication of the DNS request may comprise the DNS request extracted from the encrypted channel. The message may comprise the security token. Sending the message to the DNS server may comprise causing the message to be sent from the encryption module to another component of the DNS server.

At step 460, a reply may be received from the DNS server. The reply may comprise the security token. The reply may comprise a payload. The payload may comprise a response to the DNS request, such as website data (e.g., an IP address, Mail Exchange Record (MX Record), Delegated Signer identity (DS record), etc.), metadata, image data, text data, audio data, and/or other content.

At step 470, an indication of the payload of the reply (e.g., an indication of the DNS response to the DNS request) may be sent to the client device. The indication of the payload may be sent via the communication session. The indication of the payload may be sent to the client device based on the security token. For example, it may be determined that the security token in the reply is associated with the client and/or the communication session with the client. An indication of the security token may be stored in a lookup table and/or mapped to an identification of the communication session and/or the client device. A lookup may be performed using the security token and the table. Based on the lookup, the communication session and/or the client device may be determined. Based on the security token in the reply being associated with the communication session and/or the client, the indication of the payload may be sent to the client.

Figure 5:
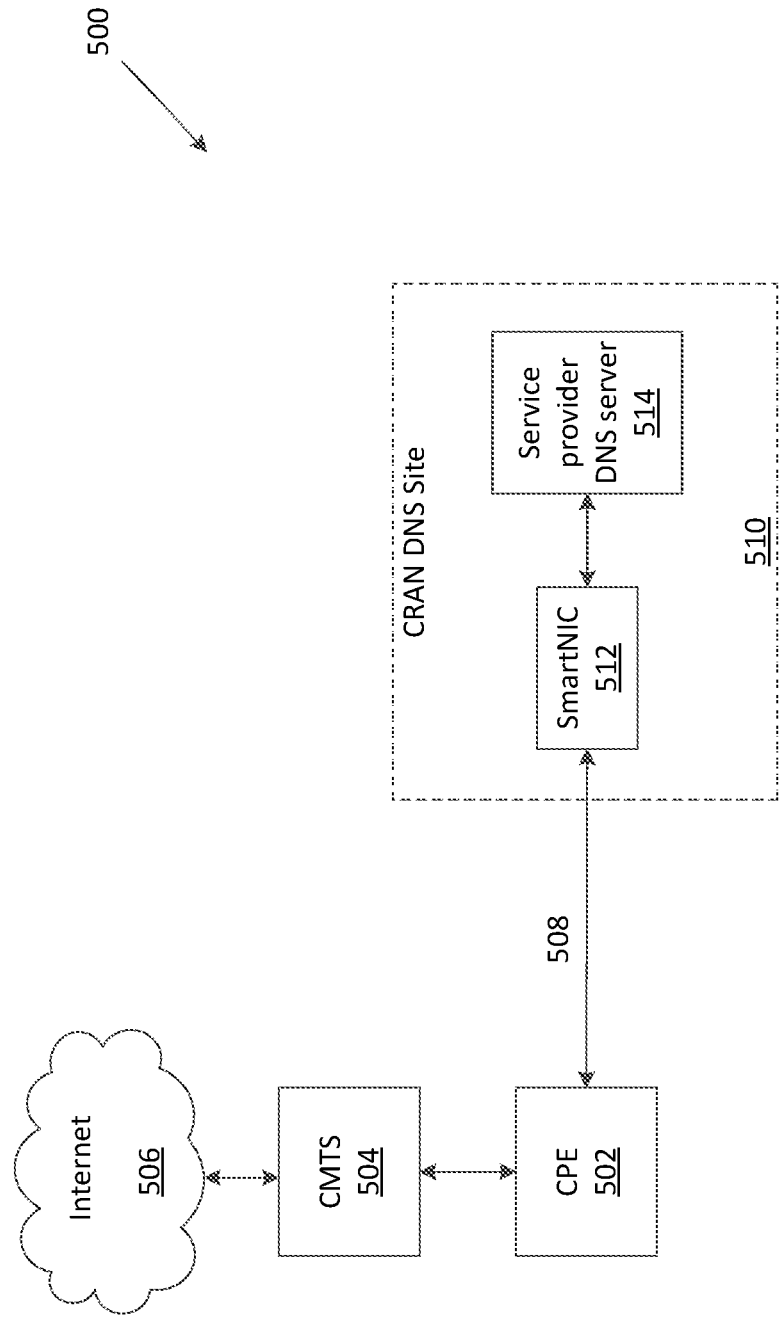
FIG. 5 shows an example system.

FIG. 5 shows an example system 500. The system 500 may comprise a Regional Network, a Metro Network, or a Converged Regional Area Network (CRAN) DNS site 510. The CRAN DNS site 510 may comprise a SmartNIC 512. The SmartNIC 512 may comprise the encryption module described in reference to FIG. 4. The CRAN DNS site 510 may comprise a service provider DNS server 514. The SmartNIC 512 and the service provider DNS server 514 may be integrated. The service provider DNS server 514 may comprise the SmartNIC 512. The SmartNIC 512 and the service provider DNS server 514 may be independent components, such as components connected via a communication bus. The DNS server 514 may comprise one or more of the recursive resolvers 106, 116, 126 in FIG. 1, the service provider DNS server 204 in FIG. 2, and/or the central platform DNS server 304 in FIG. 3.

The system 500 may comprise customer-premises equipment (CPE) 502. The CPE 502 may comprise one or more set-top boxes, cable modems, gateways, smart televisions, smart phones, laptops, desktops, tablets, wearable devices, and/or other computing devices. The CPE 502 may be configured to send and/or receive messages. The messages may comprise cleartext messages. The CPE 502 may comprise one or more of the applications 101, 110, 120 in FIG. 1, the sub resolvers 102, 112 in FIG. 1, the home network 201 or the gateway 202 in FIG. 2, or the home network 301 or the gateway 302 in FIG. 3.

The system 500 may comprise a cable modem termination system (CMTS) 504. The CMTS 502 may comprise one or more of the stub resolvers 102, 112 or the forwarders 104, 114 in FIG. 1. The CPE 502 may be configured to send and/or receive messages from the CMTS 503. The CMTS 504 may be configured to send and/or receive messages, such as cleartext messages. The CMTS 504 may be configured to send and/or receive messages via the Internet 506.

The CPE 502 may be configured to send protected messages 508. The CPE 502 may be configured to send the protected messages 508 to the CRAN DNS site 510. The protected messages 508 may comprise DoT messages. The protected messages 508 may be encrypted, such as using TLS and/or HTTPS. The protected messages 508 may comprise TLS authentication.

The SmartNIC 512 may be configured to provide co-located TLS offload and/or protocol translation. The co-located TLS offload and protocol translation may enable and/or accelerate DoH and/or DoT processing associated with the service provider DNS server 514. The service provider DNS server 514 may comprise an existing DNS server. Adding the SmartNIC 512 to the service provider DNS server 514 may add DoH and/or DoT support and/or capacity to the service provider DNS server 514. The service provider DNS server 514 may comprise and/or be in communication with multiple SmartNICs 512, allowing for scaling of DoH and/or DoT capacity independent of the service provider DNS server 514. The CRAN DNS site 510 configuration may be configured to support extension mechanisms for DNS (EDNSO) client-subnet implementations by eliminating the need for source network address translation (NAT) proxies. The CRAN DNS site 510 configuration may provide a DNS caching location to further scale DNS performance.

Figure 6:
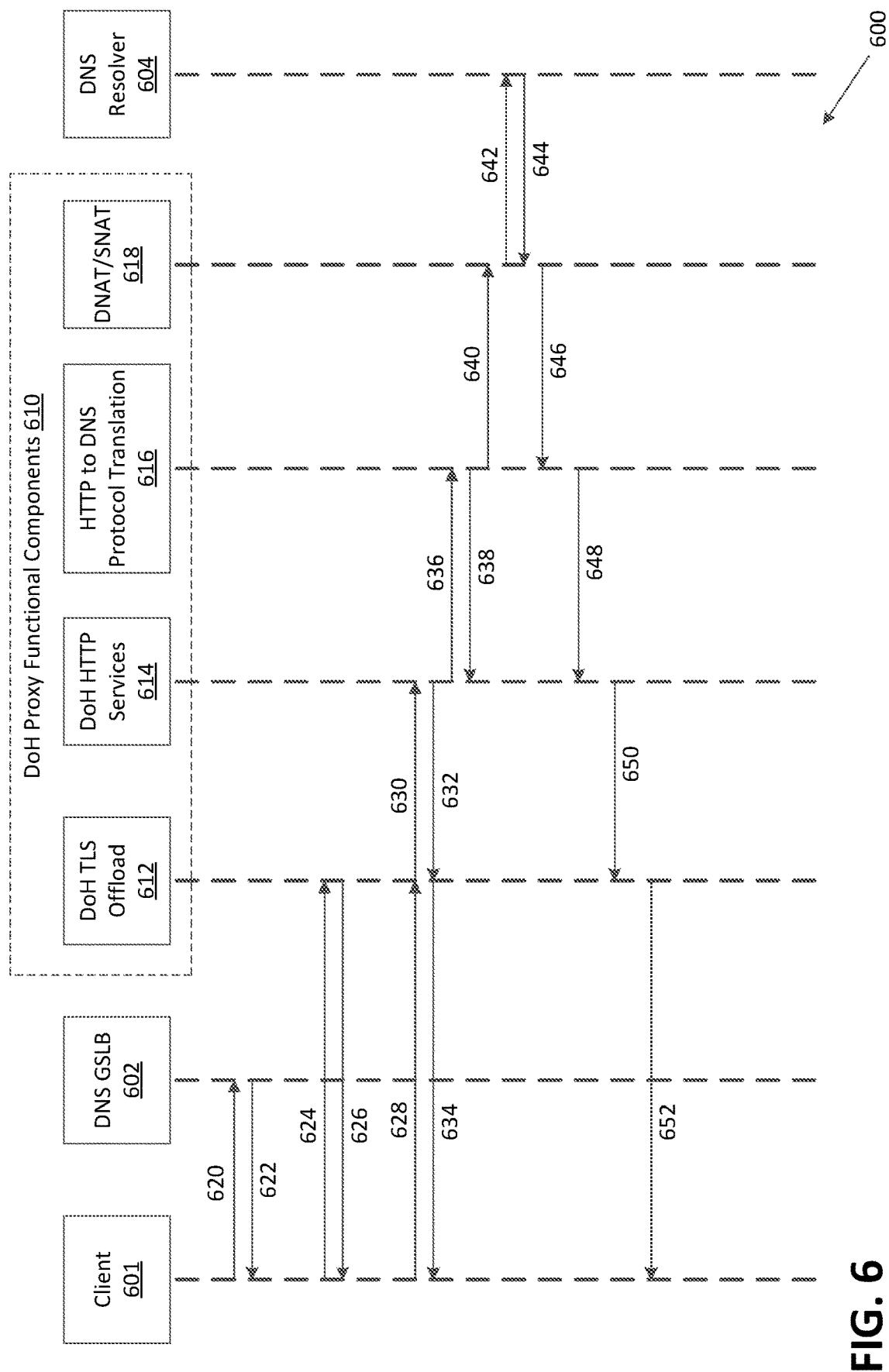
FIG. 6 shows an example method.

FIG. 6 shows an example method 600. The method may be performed by a system similar to the system in FIG. 5. At step 620, a client 601 may send a first message. The client 601 may comprise a client device. The first message may be sent via an Internet Protocol (IP), such as Internet Protocol version 4 (IPv4). The client 601 may send the first message to a DNS global server load balancing (GSLB) component 602. The DNS GSLB component 602 component may comprise a computing device. The DNS GSLB component 602 may comprise a unit and/or component of a computing device. The first message may comprise a domain name, such as an initial resolution of a fully qualified domain name (FQDN) DoH. The first message may comprise cleartext.

At step 622, the DNS GSLB component 602 may send a second message. The DNS GSLB component 602 may send the second message to the client 601. The second message may comprise a map to a DoH service endpoint. The second message may be unencrypted, for example the second message may comprise cleartext.

At step 624, the client 601 may send a third message. The client 601 may send the third message to DoH proxy functional components 610. The DoH proxy functional components 610 may comprise components of a SmartNIC, such as the SmartNIC 512 in FIG. 5. The DoH proxy functional components 610 may comprise a DoH TLS offload component 612. The DoH TLS offload component 612 may comprise a TCP and/or TLS state. The DoH HTTP services component 614 may comprise a TCP and/or HTTP state. The client 601 may send the third message to the DoH TLS offload component 612. The third message may comprise a handshake request, such as a DoH TLS handshake request. The third message may comprise TLS authentication information.

At step 626, the DoH TLS offload component 612 may send a fourth message. The DoH TLS offload component 612 may send the fourth message to the client 601. The fourth message may comprise a handshake acknowledgment, such as a DoH TLS handshake acknowledgment. The fourth message may comprise encrypted information. The fourth message may comprise TLS authentication information.

At step 628, the client 601 may send a fifth message. The client 601 may send the fifth message to the DoH TLS offload component 612. The fifth message may comprise a DoH HTTP and/or HTTPS (HTTP(S)) GET or POST request. The fifth message may comprise encrypted information. The fifth message may comprise TLS authentication information.

At step 630, the DoH TLS offload component 612 may send a sixth message. The DoH TLS offload component 612 may send the sixth message to the DoH proxy function components 610. The DoH proxy function components 610 may comprise a DoH HTTP services component 614. The DoH TLS offload component 612 may send the sixth message to the DoH HTTP services component 614. The sixth message may comprise a DoH HTTP GET or POST request. The sixth message may comprise cleartext. The DoH HTTP services component 614 may validate the request.

At step 632, the DoH HTTP services component 614 may send a seventh message. The DoH HTTP services component may send the seventh message to the DoH TLS offload component 612. The seventh message may comprise a DoH HTTP GET or POST acknowledgment. The seventh message may comprise cleartext.

At step 634, the DoH TLS offload component 612 may send an eighth message. The DoH TLS offload component 612 may send the eighth message to the client 601. The eighth message may comprise a DoH HTTP(S) GET or POST acknowledgment. The eighth message may comprise encrypted information. The eighth message may comprise TLS authentication information.

At step 636, the DoH HTTP services component 614 may send a ninth message. The DoH HTTP services component

614 may send the ninth message to the DoH proxy function components 610. The DoH proxy function components 610 may comprise an HTTP to DNS protocol translation component 616. The HTTP to DNS protocol translation component 616 may comprise a TCP and/or HTTP state. The HTTP to DNS protocol translation component 616 may comprise a DNS request on timeout. The DoH HTTP services component 614 may send the ninth message to the HTTP to DNS protocol translation component 616. The ninth message may comprise a DoH HTTP GET or POST request. The ninth message may comprise cleartext.

At step 638, the HTTP to DNS protocol translation component 616 may send a tenth message. The HTTP to DNS protocol translation component 616 may send the tenth message to the DoH HTTP services component 614. The tenth message may comprise a DoH HTTP GET or POST acknowledgment. The tenth message may comprise cleartext.

At step 640, the HTTP to DNS protocol translation component 616 may send an eleventh message to the DoH proxy function components 610. The DoH proxy function components 610 may comprise a DNAT/SNAT component 618. The DNAT/SNAT component 618 may comprise a UDP session state. The HTTP to DNS protocol translation component 616 may send the eleventh message to the DNAT/SNAT component 618. The eleventh message may comprise a DNS request. The eleventh message may comprise a DNS request on UDP port 53. The eleventh message may comprise cleartext.

At step 642, a DNAT/SNAT component 618 of the DoH proxy function components 610 may send a twelfth message. The DNAT/SNAT component 618 may send the twelfth message to the DNS resolver 604. The twelfth message may comprise a DNS request. The DNS request may comprise a DNS request on UDP port 53. The twelfth message may comprise cleartext.

At step 644, the DNS resolver 604 may send a thirteenth message. The DNS resolver 604 may send the thirteenth message to the DNAT/SNAT component 618. The thirteenth message may comprise a DNS response. The DNS response may comprise a DNS response on UDP port 53. The thirteenth message may comprise cleartext.

At step 646, the DNAT/SNAT component 618 may send a fourteenth message. The DNAT/SNAT component 618 may send the fourteenth message to the HTTP to DNS protocol translation component 616. The fourteenth message may comprise a DNS response. The DNS response may comprise a DNS response on UDP port 53. The fourteenth message may comprise cleartext.

At step 648, the HTTP to DNS protocol translation component 616 may send a fifteenth message. The HTTP to DNS protocol translation component 616 may send the fifteenth message to the DoH HTTP services component 614. The fifteenth message may comprise a DoH HTTP response. The fifteenth message may comprise cleartext.

At step 650, the DoH HTTP services component 614 may send a sixteenth message. The DoH HTTP services component 614 may send the sixteenth message to the DoH TLS offload component 612. The sixteenth message may comprise a DoH HTTP response. The sixteenth message may comprise cleartext.

At step 652, the DoH TLS offload component 612 may send a seventeenth message. The DoH TLS offload component 612 may send the seventeenth message to the client 601. The seventeenth message may comprise a DoH HTTP(S) response. The seventeenth message may comprise encrypted information. The seventeenth message may comprise TLS authentication.

Figure 7:
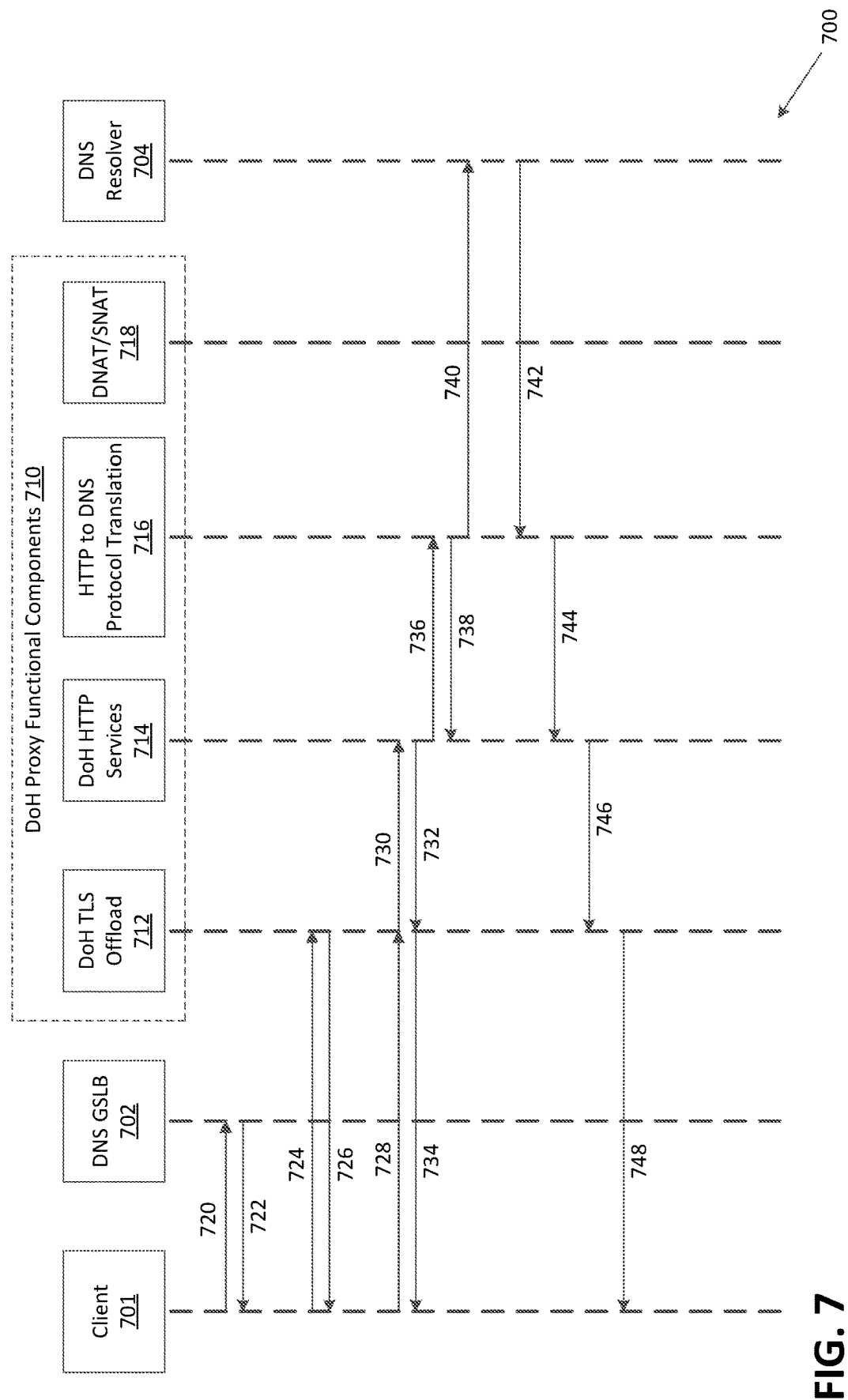
FIG. 7 shows an example method.

FIG. 7 shows an example method 700. At step 720, a client 701 may send a first message. The first message may be sent via an Internet Protocol (IP), such as Internet Protocol version 6 (IPv6). The client 701 may send the first message to a DNS GSLB component 702. The first message may comprise an initial resolution of a FQDN DoH. The first message may comprise cleartext.

At step 722, the DNS GSLB component 702 may send a second message. The DNS GSLB component 702 may send the second message to the client 701. The second message may comprise a map to a DoH service endpoint. The second message may comprise cleartext.

At step 724, the client 701 may send a third message. The client 701 may send the third message to DoH proxy functional components 710. The DoH proxy functional components 710 may comprise components of a SmartNIC, such as the SmartNIC 512 in FIG. 5. The DoH proxy functional components 710 may comprise a DoH TLS offload component 712. The DoH TLS offload component 712 may comprise a TCP and/or TLS state. The third message may comprise a DoH TLS handshake request. The third message may comprise encrypted information. The third message may comprise TLS authentication.

At step 726, the DoH TLS offload component 712 may send a fourth message. The DoH TLS offload component 712 may send the fourth message to the client 701. The fourth message may comprise a DoH TLS handshake acknowledgment. The fourth message may comprise encrypted information. The fourth message may comprise TLS authentication.

At step 728, the client 701 may send a fifth message. The client 701 may send the fifth message to the DoH TLS offload component 712. The fifth message may comprise a DoH HTTP(S) GET or POST request. The fifth message may comprise encrypted information. The fifth message may comprise TLS authentication.

At step 730, the DoH TLS offload component 712 may send a sixth message. The DoH TLS offload component 712 may send the sixth message to a DoH HTTP services component 714 of the DoH proxy functional components 710. The DoH HTTP services component 714 may comprise a TCP and/or HTTP state. The sixth message may comprise a DoH HTTP GET or POST request. The sixth message may comprise cleartext. The DoH HTTP services component 714 may validate the request.

At step 732, the DoH HTTP services component 714 may send a seventh message. The DoH HTTP services component 714 may send the seventh message to the DoH TLS offload component 712. The seventh message may comprise a DoH HTTP GET or POST acknowledgment. The seventh message may comprise cleartext.

At step 734, the DoH TLS offload component 712 may send an eighth message. The DoH TLS offload component 712 may send the eighth message to the client 701. The eighth message may comprise a DoH HTTP(S) GET or POST acknowledgment. The eighth message may comprise encrypted information. The eighth message may comprise TLS authentication.

At step 736, the DoH HTTP services component 714 may send a ninth message. The DoH HTTP services component 714 may send the ninth message to a HTTP to DNS protocol translation component 716. The HTTP to DNS protocol translation component 716 may comprise a TCP and/or HTTP state. The HTTP to DNS protocol translation component 716 may comprise a DNS request on timeout. The ninth message may comprise a DoH HTTP GET or POST request. The ninth message may comprise cleartext.

At step 738, the HTTP to DNS protocol translation component 716 may send a tenth message to the DoH HTTP services component 714. The tenth message may comprise a DoH HTTP GET or POST acknowledgment. The tenth message may comprise cleartext.

At step 740, the HTTP to DNS protocol translation component 716 may send an eleventh message. The HTTP to DNS protocol translation component 716 may send the eleventh message to the DNS resolver 704. The eleventh message may comprise a DNS request. The eleventh message may comprise a DNS request on UDP port 53. The eleventh message may comprise cleartext.

At step 742, the DNS resolver 704 may send a twelfth message. The DNS resolver 704 may send a twelfth message to the HTTP to DNS protocol translation component 716. The twelfth message may comprise a DNS response. The twelfth message may comprise a DNS response on UDP port 53. The twelfth message may comprise cleartext.

At step 744, the HTTP to DNS protocol translation component 716 may send a thirteenth message. The HTTP to DNS protocol translation component 716 may send the thirteenth message to the DoH HTTP services component 714. The thirteenth message may comprise a DoH HTTP response. The thirteenth message may comprise cleartext.

At step 746, the DoH HTTP services component 714 may send a fourteenth message. The DoH HTTP services component 714 may send the fourteenth message to the DoH TLS offload component 712. The fourteenth message may comprise a DoH HTTP response. The fourteenth message may comprise cleartext.

At step 748, the DoH TLS offload component 712 may send a fifteenth message. The DoH TLS offload component 712 may send the fifteenth message to the client 701. The fifteenth message may comprise a DoH HTTP(S) response. The fifteenth message may comprise encrypted information. The fifteenth message may comprise TLS authentication.

Figure 8:
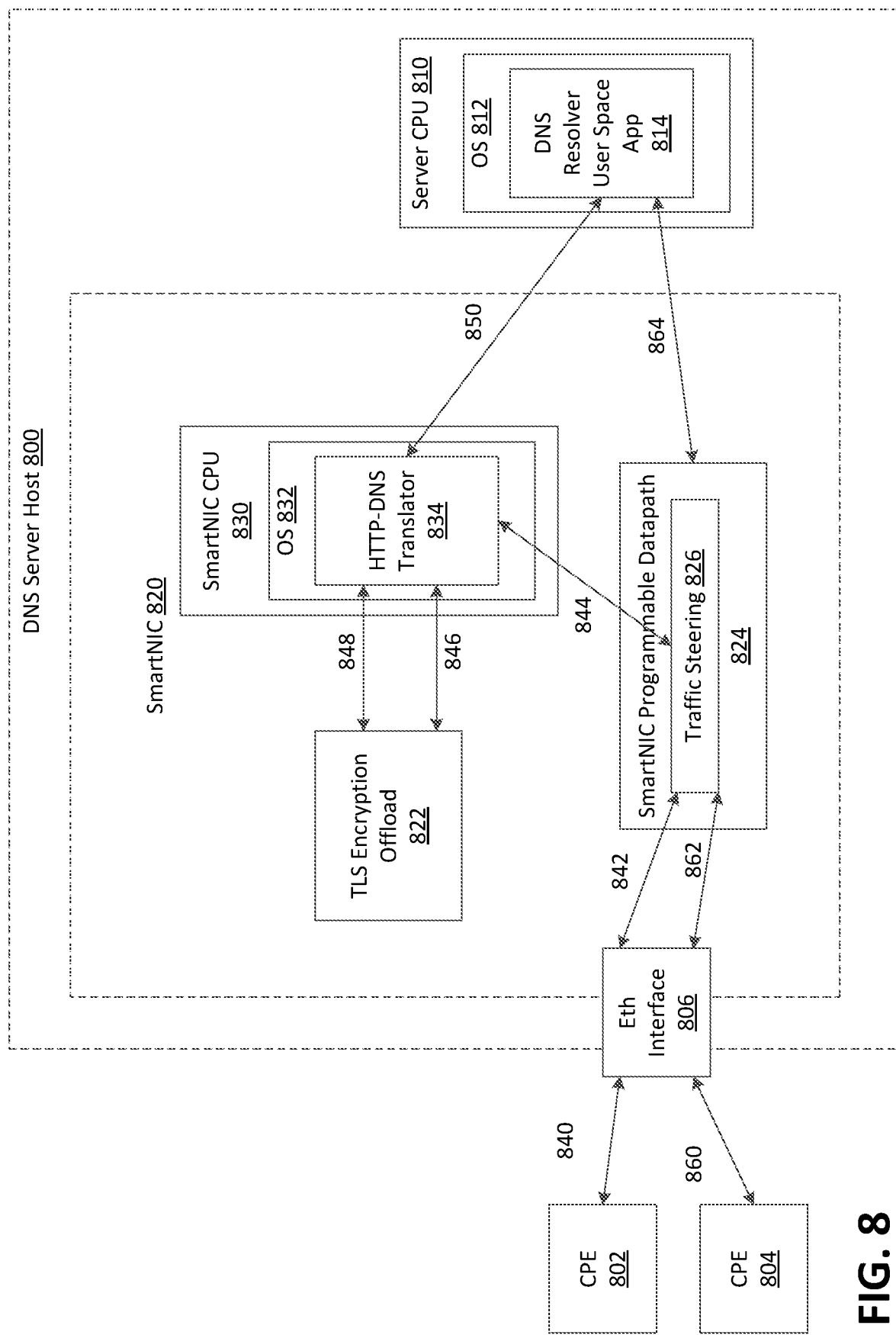
FIG. 8 shows an example system.

FIG. 8 shows an example SmartNic 820. The SmartNic 820 may comprise the SmartNIC 512 in FIG. 5. The SmartNic 820 may comprise the encryption module described in reference to FIG. 4. The SmartNic 820 may comprise a component of a DNS server host 800. The DNS server host 800 may comprise an Ethernet networking interface 806. The DNS server host 800 may comprise a server CPU 810. The DNS server host 800 may be configured to communicate with one or more CPEs, such as a first CPE 802 and a second CPE 804. The DNS server host 800 may be configured to communicate with the CPE's 802, 804 via an Ethernet networking interface 806. The CPEs 802, 804 may comprise one or more set-top boxes, cable modems, gateways, smart televisions, smart phones, laptops, desktops, tablets, wearable devices, and/or other computing devices. The Ethernet networking interface 806 may be configured to convert network messages into signals suitable for the DNS server host 800. The Ethernet networking interface 806 may be configured to convert signals generated by the DNS server host 800 into messages suitable for a networking protocol. The server CPU 810 may comprise an operating system (OS) 812. The OS 812 may comprise a Linux OS. The OS 812 may comprise instructions for executing (e.g., running, etc.) a DNS resolver user space application 814.

The SmartNIC 820 may comprise a TLS encryption offload component 822. The SmartNIC 820 may comprise a SmartNIC programmable datapath component 824. The SmartNIC 820 may comprise a SmartNIC CPU 830. The TLS encryption offload component 822 may be configured to decrypt messages from the CPEs 802, 804. The TLS encryption offload component 822 may be configured to encrypt message to the CPEs 802, 804 without using other computational resources of the DNS server host 800. The SmartNIC programmable datapath component 824 may comprise a traffic steering component 826. The SmartNIC CPU 830 may comprise an OS 832. The OS 832 may comprise a Linux OS. The OS 832 may comprise instructions for executing an HTTP-DNS translator 834. The traffic steering component 826 may be configured to direct messages to an appropriate CPU within the DNS server host 800. The traffic steering component 826 may be configured to direct encrypted messages to the SmartNIC CPU 830. The traffic steering component 826 may be configured to direct cleartext messages to the server CPU 810.

The first CPE 802 and the Ethernet networking interface 806 may be configured to communicate via a first protected datapath 840. The first protected datapath 840 may comprise one or more networking components. Messages sent via the first protected datapath 840 may comprise DoH messages and/or DoT messages. Messages sent from the first CPE 802 to the Ethernet networking interface 806 via the first protected datapath 840 may comprise a DoH HTTP request. Messages sent from the Ethernet networking interface 806 to the first CPE 802 via the first protected datapath 840 may comprise a DoH HTTP response. Messages sent via the first protected datapath 840 may comprise encrypted messages. Messages sent via the first protected datapath 840 may comprise TLS authentication.

The Ethernet networking interface 806 and the SmartNIC programmable datapath component 824 may be configured to communicate via a second protected datapath 842. The second protected datapath 842 may comprise one or more communication buses. Messages sent via the second protected datapath 842 may comprise DoH messages. Messages sent from the Ethernet networking interface 806 to the SmartNIC programmable datapath component 824 via the second protected datapath 842 may comprise a DoH HTTP request. Messages sent from the SmartNIC programmable datapath component 824 to the Ethernet networking interface 806 via the second protected datapath 842 may comprise a DoH HTTP response. Messages sent via the second protected datapath 842 may comprise encrypted messages. Messages sent via the second protected datapath 842 may comprise TLS authentication.

The SmartNIC programmable datapath component 824 and the SmartNIC CPU 830 may communicate via a third protected datapath 844. The third protected datapath 844 may comprise one or more communication buses. Messages sent via the third protected datapath 844 may comprise DoH messages. Messages sent from the SmartNIC programmable datapath component 824 to the SmartNIC CPU 830 via the third protected datapath 844 may comprise a DoH HTTP request. Messages sent from the SmartNIC CPU 830 to the SmartNIC programmable datapath component 824 via the third protected datapath 844 may comprise a DoH HTTP response. Messages sent via the third protected datapath 844 may comprise encrypted messages. Messages sent via the third protected datapath 844 may comprise TLS authentication.

The SmartNIC CPU 830 and the TLS encryption offload component 822 may communicate via a fourth protected datapath 846. The fourth protected datapath 846 may comprise one or more communication buses. Messages sent via the fourth protected datapath 846 may comprise encrypted messages. Messages sent via the fourth protected datapath 846 may comprise TLS authentication. Messages sent to the TLS encryption offload component 822 from the SmartNIC CPU 830 via the fourth protected datapath 846 may comprise encrypted data in need of decryption. Messages sent to the SmartNIC CPU 830 from the TLS encryption offload component 822 via the fourth protected datapath 846 may comprise encrypted data, wherein the data was encrypted in response to a request from the SmartNIC CPU 830.

The SmartNIC CPU 830 and the TLS encryption offload component 822 may communicate via a first unprotected datapath 848. The first unprotected datapath 848 may comprise one or more communication buses. The first unprotected datapath 848 and the fourth protected datapath 846 may share physical and/or logical components. Messages sent via the first unprotected datapath 848 may comprise cleartext messages. Messages sent to the TLS encryption offload component 822 from the SmartNIC CPU 830 via the first unprotected datapath 848 may comprise data in need of encryption. Messages sent to the SmartNIC CPU 830 from the TLS encryption offload component 822 via the first unprotected datapath 848 may comprise decrypted data.

The SmartNIC CPU 830 and the server CPU 810 may communicate via a second unprotected datapath 850. The second unprotected datapath 850 may comprise one or more communication buses. Messages sent via the second unprotected datapath 850 may comprise cleartext messages. Messages sent from the SmartNIC CPU 830 to the server CPU 810 via the second unprotected datapath 850 may comprise a cleartext DNS request. Messages sent from the server CPU 810 to the SmartNIC CPU 830 via the second unprotected datapath 850 may comprise a cleartext DNS response.

The second CPE 804 and the Ethernet networking interface 806 may communicate via a first cleartext datapath 860. The first cleartext datapath 860 may comprise one or more networking components. Messages sent via the first cleartext datapath 860 may comprise cleartext DNS messages. Messages sent from the second CPE 804 to the Ethernet networking interface 806 via the first cleartext datapath 860 may comprise a cleartext DNS request. Messages sent from the Ethernet networking interface 806 to the second CPE 804 via the first cleartext datapath 860 may comprise a cleartext DNS response.

The Ethernet networking interface 806 and the SmartNIC programmable datapath component 824 may communicate via a second cleartext datapath 862. The second cleartext datapath 862 may comprise one or more communication buses. Messages sent via the second cleartext datapath 862 may comprise cleartext DNS messages. Messages sent from the Ethernet networking interface 806 to the SmartNIC programmable datapath component 824 via the second cleartext datapath 862 may comprise a cleartext DNS request. Messages sent from the SmartNIC programmable datapath component 824 to the Ethernet networking interface 806 via second cleartext datapath 862 may comprise a cleartext DNS response.

The SmartNIC programmable datapath component 824 and the server CPU 810 may communicate via a third cleartext datapath 864. The third cleartext datapath 864 may comprise one or more communication buses. Messages sent via the third cleartext datapath 864 may comprise cleartext DNS messages. Messages sent from the SmartNIC programmable datapath component 824 to the server CPU 810 via the third cleartext datapath 864 may comprise a cleartext DNS request. Messages sent from the server CPU 810 to the SmartNIC programmable datapath component 824 via the third cleartext datapath 864 may comprise a cleartext DNS response.

Figure 9:
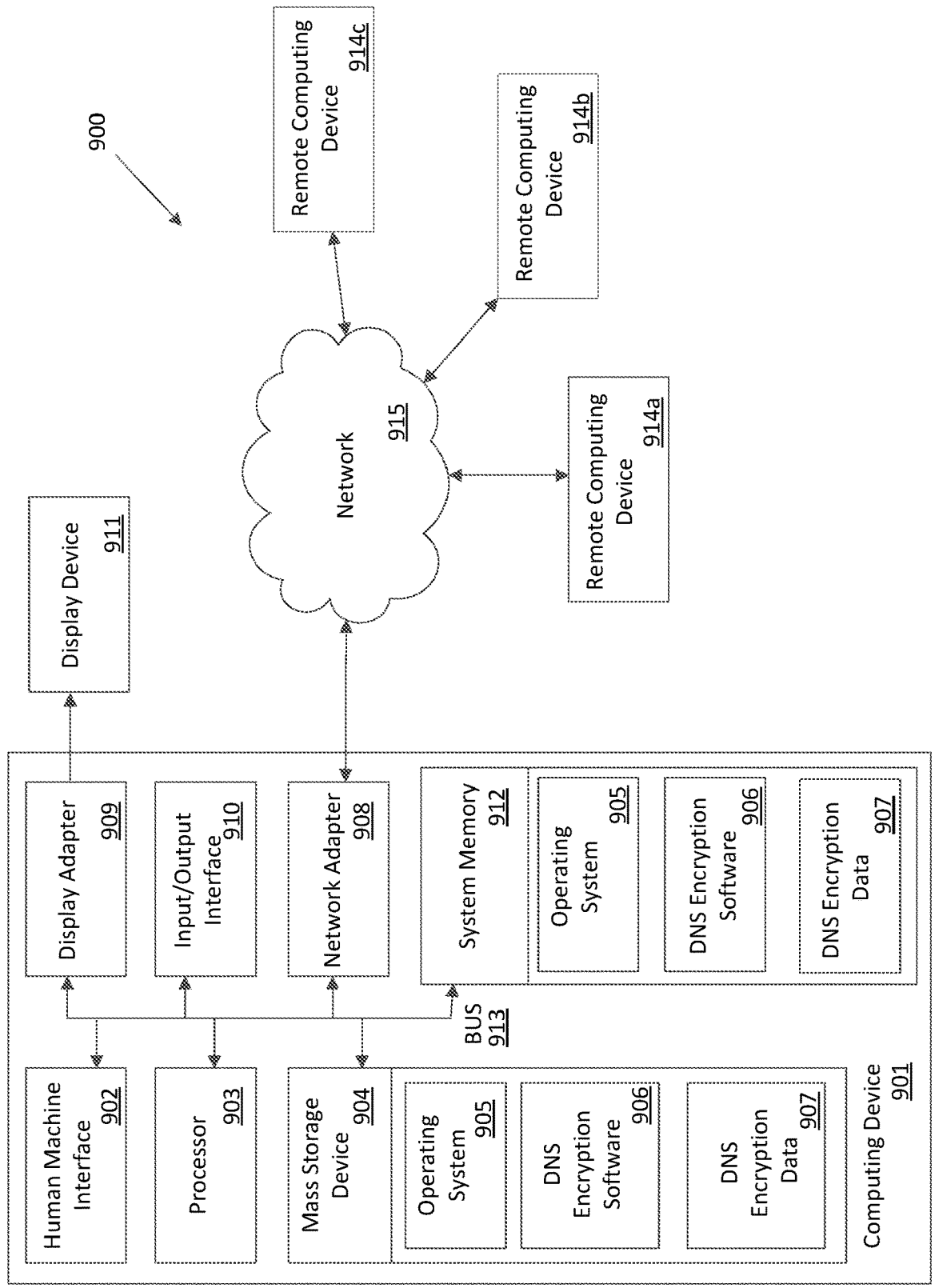
FIG. 9 shows an example computing environment.

FIG. 9 shows an example computing environment 900. The systems, methods, and apparatuses described herein may be implemented on a computing device such as a computing device 901. Any of the components of a SmartNIC, such as SmartNIC 512 in FIG. 5, or a DNS server, such as service provider DNS server 514 in FIG. 5 or DNS server host 800 in FIG. 8, may comprise a computing device as shown in FIG. 9. Similarly, the methods, systems, and apparatuses disclosed may utilize one or more computing device to perform one or more functions in one or more locations. The computing environment is not intended to suggest any limitation as to the scope of use or functionality of computing environment architecture. Neither should the computing environment 900 be interpreted as having any dependency or requirement relating to any one or combination of components shown in the computing environment 900.

The systems, methods, and apparatuses described herein may be operational with numerous other general purpose or special purpose computing system environments or configurations. Computing systems, environments, and/or configurations that may be suitable for use with the systems, methods, and apparatuses comprise, but are not limited to, personal computers, server computers, laptop devices, and multiprocessor systems. Set top boxes, programmable consumer electronics, network PCs, minicomputers, mainframe computers, distributed computing environments that comprise any of the above systems or devices, and the like may be used to implement the methods, systems, and apparatuses.

The systems, methods, and apparatuses may be implemented, in whole or in part, by software components. The disclosed methods, systems, and apparatuses may be described in the general context of computer-executable instructions, such as program modules, being executed by one or more computers or other devices. Program modules comprise computer code, routines, programs, objects, components, data structures, etc. that perform particular tasks or implement particular abstract data types. The methods, systems, and apparatuses may be practiced in grid-based and distributed computing environments where tasks are performed by remote processing devices that are linked through a communications network. In a distributed computing environment, program modules may be located in both local and remote computer storage media including memory storage devices.

The methods, systems, and apparatuses may be implemented via a general-purpose computing device in the form of a computing device 901. The components of the computing device 901 may comprise, but are not limited to, one or more processors 903, a system memory 912, and a system bus 913 that couples various system components including the processor 903 to the system memory 912. With multiple processors 503, the system may utilize parallel computing.

The system bus 913 represents one or more of several possible types of bus structures, including a memory bus or memory controller, a peripheral bus, an accelerated graphics port, and a processor or local bus using any of a variety of bus architectures. Such architectures may comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCM-CIA), Universal Serial Bus (USB) and the like. The bus 913, and all buses specified in this description may be implemented via a wired or wireless network connection and each of the subsystems, including the processor 903, a mass storage device 904, an operating system 905, DNS encryption software 906, DNS encryption data 907, a network adapter 908, system memory 912, an Input/Output Interface 910, a display adapter 909, a display device 911, and a human machine interface 902, may be contained within one or more remote computing devices 914a,b,c at physically separate locations, connected through buses of this form, in effect implementing a fully distributed system.

The computing device 901 typically comprises a variety of computer readable media. Readable media may be any available media that is accessible by the computing device 901 and comprises both volatile and non-volatile media, removable and non-removable media. The system memory 912 comprises computer readable media in the form of volatile memory, such as random access memory (RAM), and/or non-volatile memory, such as read only memory (ROM). The system memory 912 typically contains data such as DNS encryption data 907 and/or program modules such as operating system 905 and DNS encryption software 906 that are immediately accessible to and/or are presently operated on by the processor 903.

The computing device 901 may comprise other removable/non-removable, volatile/non-volatile computer storage media. FIG. 9 shows a mass storage device 504 which may provide non-volatile storage of computer code, computer readable instructions, data structures, program modules, and other data for the computing device 901. A mass storage device 904 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules may be stored on the mass storage device 904, including an operating system 905 and DNS encryption software 906. Each of the operating system 905 and DNS encryption software 906 (or some combination thereof) may comprise elements of the programming and the DNS encryption software 906. DNS encryption data 907 may be stored on the mass storage device 904. DNS encryption data 907 may be stored in any of one or more databases known in the art. Such databases may comprise, DB2®, Microsoft® Access, Microsoft® SQL Server, Oracle®, mySQL, PostgreSQL, and the like. The databases may be centralized or distributed across multiple systems.

The user may enter commands and information into the computing device 901 via an input device (not shown). Input devices may comprise, but are not limited to, a keyboard, pointing device (e.g., a "mouse"), a microphone, a joystick, tactile input devices such as gloves, and other body coverings, and the like. These and other input devices may be connected to the processor 903 via a human machine interface 902 that is coupled to the system bus 913, but may be connected by other interface and bus structures, such as a parallel port, game port, an IEEE 694 Port (also known as a Firewire port), a serial port, or a universal serial bus (USB).

A display device 911 may be connected to the system bus 913 via an interface, such as a display adapter 909. It is contemplated that the computing device 901 may have more than one display adapter 909 and the computing device 901 may have more than one display device 911. A display device may be a monitor, an LCD (Liquid Crystal Display), or a projector. Output peripheral devices may comprise components such as speakers (not shown) and a printer (not shown) which may be connected to the computing device 901 via Input/Output Interface 910. Any step and/or result of the methods may be output in any form to an output device. Such output may be any form of visual representation, including, but not limited to, textual, graphical, animation, audio, tactile, and the like. The display 911 and computing device 901 may be part of one device, or separate devices.

The computing device 901 may operate in a networked environment using logical connections to one or more remote computing devices 914a,b,c. A remote computing device may be a personal computer, portable computer, smartphone, a server, a router, a network computer, a peer device or other common network node, and so on. Logical connections between the computing device 901 and a remote computing device 914a,b,c may be made via a network 915, such as a local area network (LAN) and a general wide area network (WAN). Such network connections may be through a network adapter 908. A network adapter 908 may be implemented in both wired and wireless environments. Such networking environments are conventional and commonplace in dwellings, offices, enterprise-wide computer networks, intranets, and the Internet.

Application programs and other executable program components such as the operating system 905 are shown herein as discrete blocks, although it is recognized that such programs and components reside at various times in different storage components of the computing device 901, and are executed by the data processor(s) of the computer. An implementation of DNS encryption software 906 may be stored on or sent across some form of computer readable media. Any of the disclosed methods may be performed by computer readable instructions embodied on computer readable media. Computer readable media may be any available media that may be accessed by a computer. Computer readable media may comprise "computer storage media" and "communications media." "Computer storage media" comprise volatile and non-volatile, removable and non-removable media implemented in any methods or technology for storage of information such as computer readable instructions, data structures, program modules, or other data. Computer storage media may comprise, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computing device.

What is claimed:

1. A method comprising:
   receiving, by an encryption module of a domain name system (DNS) server, and from a client device, a message;
   establishing, by the encryption module of the DNS server and based on the receiving the message, a secure communication session with the client device;
   determining a DNS request associated with the message, wherein the DNS request identifies an IP address associated with the client device and a domain name query;
   determining, by applying a one-way hash function to at least the identified IP address associated with the client device, a security token;

sending, by the encryption module of the DNS server and to a DNS resolver module of the DNS server, the security token and the domain name query;

receiving, from the DNS resolver module of the DNS server, a reply comprising a payload and the security token; and sending, by the encryption module of the DNS server and based on the security token, an indication of the payload of the reply to the client device via the secure communication session.

2. The method of claim 1, wherein the encryption module comprises a smart network interface card (SmartNIC).

3. The method of claim 1, further comprising:
storing, to a lookup table, an indication of the security token mapped to an indication of an identification of the secure communication session; and
wherein sending, based on the security token, the reply comprises determining, by performing a lookup in the lookup table, the communication session.

4. The method of claim 1, wherein the secure communication session comprises at least one of a transport layer security (TLS) session or a hypertext transfer protocol secure (HTTPS) session.

5. The method of claim 1, wherein the DNS request comprises a fully qualified domain name.

6. The method of claim 1, wherein the DNS request comprises at least one of a DNS over HTTP (DoH) or a DNS over TLS (DOT) request.

7. The method of claim 1, wherein the DNS request further identifies a port associated with the client device.

8. A device comprising:
one or more processors; and
memory storing instructions that, when executed by the one or more processors, cause the device to:
receive, by an encryption module of a domain name system (DNS) server, and from a client device, a message;
establish, by the encryption module of the DNS server and based on the receiving the message, a secure communication session with the client device;
determine a DNS request associated with the message, wherein the DNS request identifies an IP address associated with the client device domain name query;
determine, by applying a one-way hash function to at least the identified IP address associated with the client device, a security token;
send, by the encryption module of the DNS server and to a DNS resolver module of the DNS server, the security token and the domain name query;
receive, from the DNS resolver module of the DNS server, a reply comprising a payload and the security token; and
send, by the encryption module of the DNS server and based on the security token, an indication of the payload of the reply to the client device via the secure communication session.

9. The device of claim 8, wherein the encryption module comprises a smart network interface card (SmartNIC).

10. The device of claim 8, wherein the instructions further cause the device to:
store, to a lookup table, an indication of the security token mapped to an indication of an identification of the secure communication session; and
determine, by performing a lookup in the lookup table using the security token in the reply, to send the payload of the reply to the client device via the secure communication session.

11. The device of claim 8, wherein the secure communication session comprises at least one of a transport layer security (TLS) session or a hypertext transfer protocol secure (HTTPS) session.

12. The device of claim 8, wherein the DNS request comprises a fully qualified domain name.

13. The device of claim 8, wherein the DNS request comprises at least one of a DNS over HTTP (DoH) or a DNS over TLS (DOT) request.

14. A non-transitory computer-readable medium storing instructions that, when executed, cause:
receiving, by an encryption module of a domain name system (DNS) server, and from a client device, a message;
establishing, by the encryption module of the DNS server and based on the receiving the message, a secure communication session with the client device;
determining-a DNS request associated with the message, wherein the DNS request identifies an IP address associated with the client device and a domain name query;
determining, by applying a one-way hash function to at least the identified IP address associated with the client device, a security token;
sending, by the encryption module of the DNS server and to a DNS resolver module of the DNS server, the security token and the domain name query;
receiving, from the DNS resolver module of the DNS server, a reply comprising a payload and the security token; and
sending, by the encryption module of the DNS server and based on the security token, an indication of the payload of the reply to the client device via the secure communication session.

15. The non-transitory computer-readable medium of claim 14, wherein the secure communication session comprises at least one of a transport layer security (TLS) session or a hypertext transfer protocol secure (HTTPS) session.

16. The non-transitory computer-readable medium of claim 14, wherein the DNS request comprises a fully qualified domain name.

17. The non-transitory computer-readable medium of claim 14, wherein the DNS request comprises at least one of a DNS over HTTP (DoH) or a DNS over TLS (DOT) request.

* * * * *